United States Patent [19]
Brown

[11] Patent Number: 5,934,311
[45] Date of Patent: Aug. 10, 1999

[54] LINESTOPPING SYSTEM

[75] Inventor: Stephen Reginald Brown, Alfred Cove, Australia

[73] Assignee: Water Corporation, Australia

[21] Appl. No.: 09/051,243

[22] PCT Filed: Oct. 4, 1996

[86] PCT No.: PCT/AU96/00625

§ 371 Date: Jul. 20, 1998

§ 102(e) Date: Jul. 20, 1998

[87] PCT Pub. No.: WO97/13096

PCT Pub. Date: Apr. 10, 1997

[30] Foreign Application Priority Data

Oct. 5, 1995 [AU] Australia ................. PN5815

[51] Int. Cl.⁶ ................. F16L 55/124
[52] U.S. Cl. ................. 137/240; 137/599; 251/61.1; 138/93
[58] Field of Search ............ 138/93, 94; 251/61.1; 137/599, 240

[56] References Cited

U.S. PATENT DOCUMENTS

| | | |
|---|---|---|
| 1,795,848 | 3/1931 | Drees . |
| 2,002,383 | 5/1935 | Witt ................. 137/599 |
| 2,171,942 | 9/1939 | Mueller ................. 137/599 |
| 2,299,116 | 10/1942 | Svirsky . |
| 2,678,666 | 5/1954 | Theis et al. ................. 138/93 |
| 2,811,985 | 11/1957 | Wells . |
| 2,927,609 | 3/1960 | Vanderlans . |
| 3,154,106 | 10/1964 | Ver Nooy . |
| 3,298,398 | 1/1967 | Smith . |
| 3,431,946 | 3/1969 | Sawyer ................. 138/93 |
| 3,498,333 | 3/1970 | Jones . |
| 3,564,103 | 2/1971 | Brachschob ................. 138/93 X |
| 3,665,966 | 5/1972 | Ver Nooy . |

(List continued on next page.)

FOREIGN PATENT DOCUMENTS

| | | |
|---|---|---|
| 4050968 | 1/1970 | Australia . |
| 1342470 | 10/1971 | Australia . |
| 0256949 | 2/1988 | European Pat. Off. . |
| 0294243 | 12/1988 | European Pat. Off. . |
| 2577653 | 8/1986 | France . |
| 1311017 | 3/1973 | United Kingdom . |
| 1576356 | 10/1980 | United Kingdom . |
| 2109326 | 6/1983 | United Kingdom . |
| 2137718 | 3/1984 | United Kingdom . |

OTHER PUBLICATIONS

Patent Abstracts of Japan, No. 4–136590, dated May 11, 1992.

*Primary Examiner*—Stephen M. Hepperle
*Assistant Examiner*—John Bastianelli
*Attorney, Agent, or Firm*—Bachman & LaPointe, P.C.

[57] ABSTRACT

A linestopping system for pipes includes first and second linestopping means, each linestopping means including an inflatable plug, an inflation means and an insertion means and first and second branch pipe supports each having an apertured flange with a pipe section mounted thereon at an acute angle, each pipe section containing a valve. In use, the pipe supports are disposed on a pipe in spaced apart locations with the pipe sections facing in opposite directions such that upon apertures being cut in the pipe at the pipe supports the inflatable plugs of respective linestopping means are inserted by the insertion means through the apertures in the pipe and subsequently inflated by the inflation means so as to seal off a section of the pipe. Each insertion means includes a plurality of sets of hydraulic clamps, a first set of clamps being fixed relative to the insertion means and a second set of clamps being movable relative to the insertion means, such that the first and second sets are relatively moveable so as to cause insertion of the respective inflatable plug into the pipe. A bypass pipe extends between the first and second linestopping means to allow fluid flow to be maintained when the section of the pipe is sealed off.

11 Claims, 7 Drawing Sheets

U.S. PATENT DOCUMENTS

| | | |
|---|---|---|
| 3,842,864 | 10/1974 | Riegel et al. . |
| 3,870,085 | 3/1975 | Schneider . |
| 4,013,097 | 3/1977 | Calandra ................................... 138/93 |
| 4,079,755 | 3/1978 | Van De Lans ........................... 138/93 |
| 4,155,373 | 5/1979 | Digiovanni . |
| 4,291,727 | 9/1981 | Yie et al. . |
| 4,351,349 | 9/1982 | Minotti . |
| 4,428,204 | 1/1984 | Brister . |
| 4,458,721 | 7/1984 | Yie et al. . |
| 4,467,835 | 8/1984 | Champleboux . |
| 4,467,836 | 8/1984 | Ragout . |
| 4,505,295 | 3/1985 | Quin et al. . |
| 4,649,948 | 3/1987 | Hudson . |
| 4,660,603 | 4/1987 | Tash . |
| 5,186,199 | 2/1993 | Murphy . |
| 5,353,842 | 10/1994 | Lundman . |
| 5,778,919 | 7/1998 | Petrone ................................. 138/93 X |

LINESTOPPING SYSTEM

DESCRIPTION OF THE INVENTION

The present invention relates to a linestopping system for stopping the flow of fluids or gases in a section of a pipe.

FIELD OF THE INVENTION

Repair and replacement of pipes, whether in an emergency or maintenance situation, is a financial liability for service providers such as Utilities and Processors. Linestopping presently involves removing an approximately circular section of approximately the same radius as the pipe from an upper portion of the pipe. Removal of the section can seriously weaken the pipe structure, requiring reinforcement or strapping of the pipe. This reinforcement may take the form of pipe encasing metal sleeves secured to the pipe. Additionally, concrete reinforcing is often used. Considerable human and consumable resources are required to ensure adequate reinforcing is provided.

Once the pipe is reinforced, the process of line stopping employed hitherto involves several stages. The first stage is to attach an upwardly protruding branch connection to the pipe, such that the circumference of the aperture caused by removing the section is enclosed. The support section and the associated line stopper insertion apparatus is then attached to the protruding connection via a flange. The third stage of the operation involves insertion of the linestopper at an angle approximately ninety degrees to the direction of flow through the pipe. The linestopper is inserted into the pipe, by way of a linestopper insertion apparatus. Where the line stopper is a rubber line stopper, it is forced through the aperture and deforms to seal around the internal circumference of the pipe. The length of the rubber line stopper is limited to the diameter of the aperture. Alternatively, where the line stopper employs a solid hinged rubber seated disc to seal the pipe, the disc is positioned such that the plane of the disc is at an angle approximately ninety degrees to the direction of flow through the pipe. Both these methods have limitations, in addition to the time and cost liabilities previously discussed. These limitations include the physical size of the equipment, weakening of the pipe to be linestopped and little or no capability for the equipment to deal with a range of pipe sizes. Further, these methods are only effective when used with pipes having a smooth interior surface. Any debris or irregularities on the inside of the pipe greatly reduce the effectiveness of previously known linestopping devices. In addition, these methods result in the application of large forces onto the pipeline, which usually cause weakening. Further these methods do not cater for the flow of fluid to continue around the section of pipe to be repaired or replaced.

One method for dealing with line stopping, used predominantly in the petroleum industry, is to insert steel packers with a rubber jacket within the pipe. The rubber jacket is arranged such that a seal can be produced between the pipe and the packer by inflating the rubber jacket. These packers are inflexible and they have to be custom made for each application. They are usually used in very high pressure applications. Other main disadvantages of this method are the requirement to access one end of the pipe and the interruption of the flow.

SUMMARY OF THE INVENTION

The present invention seeks to, at least in part, overcome some or all of the problems of the prior art outlined above.

According to one aspect of the present invention there is provided a linestopping system for pipes characterised by first and second linestopping means, each linestopping means including an inflatable plug, an inflation means and an insertion means, first and second branch pipe supports each having an apertured flange with a pipe section mounted thereon at an acute angle, each pipe section containing a valve wherein, in use, the pipe supports are disposed on a pipe in spaced apart locations with the pipe sections facing in opposite directions such that upon apertures being cut in the pipe at the pipe supports inflatable plugs of respective line stopping means may be inserted by the insertion means through the apertures in the pipe and subsequently inflated by the inflation means so as to seal off a section of the pipe.

BRIEF DESCRIPTION OF THE DRAWINGS

The present invention will now be described, by way of example, with reference to the accompanying figures in which.

DETAILED DESCRIPTION OF THE INVENTION

Figure 1:
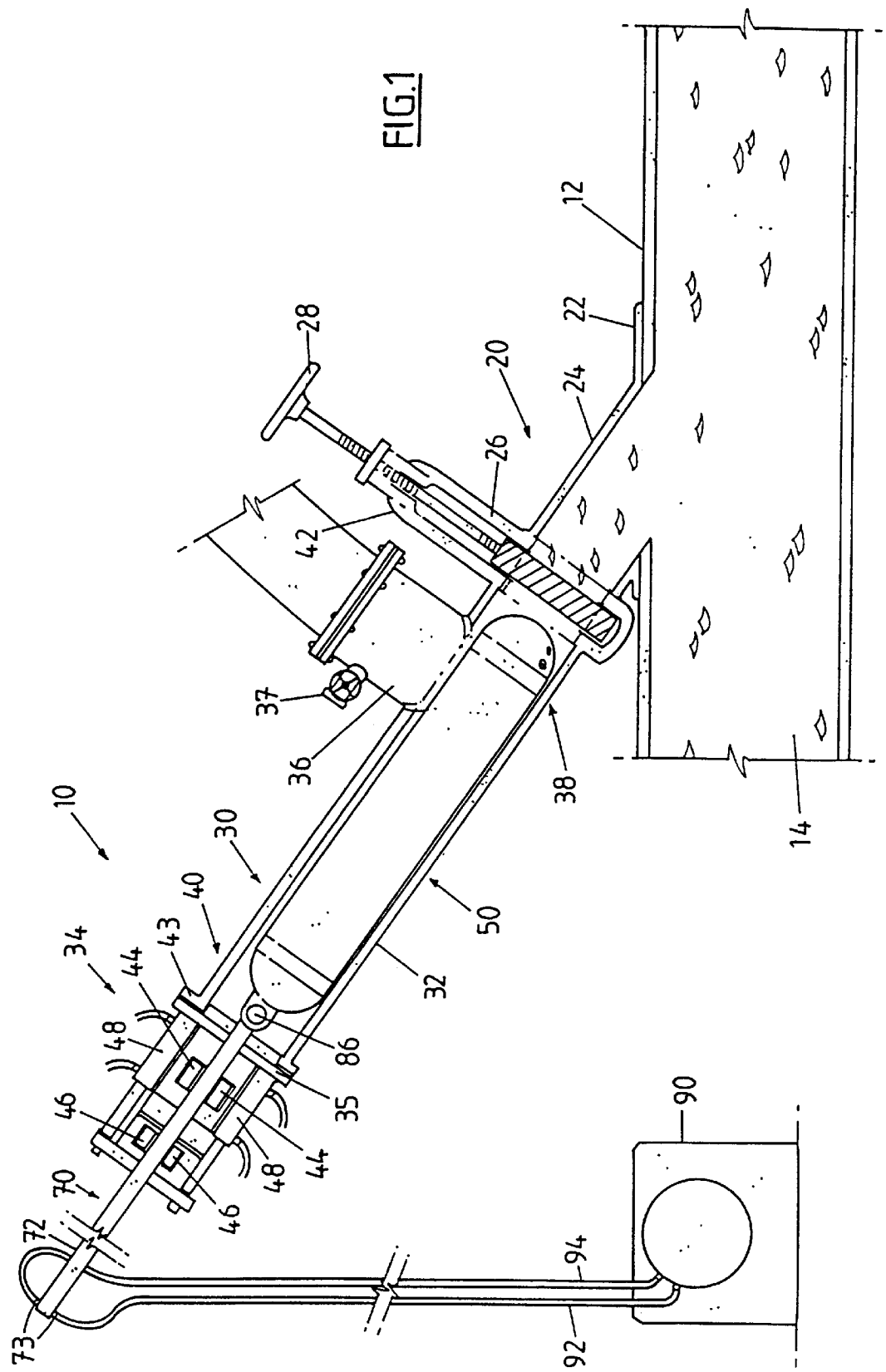
FIG. 1 represents a schematic side view of a linestopping system attached to a pipe.
Figure 2:
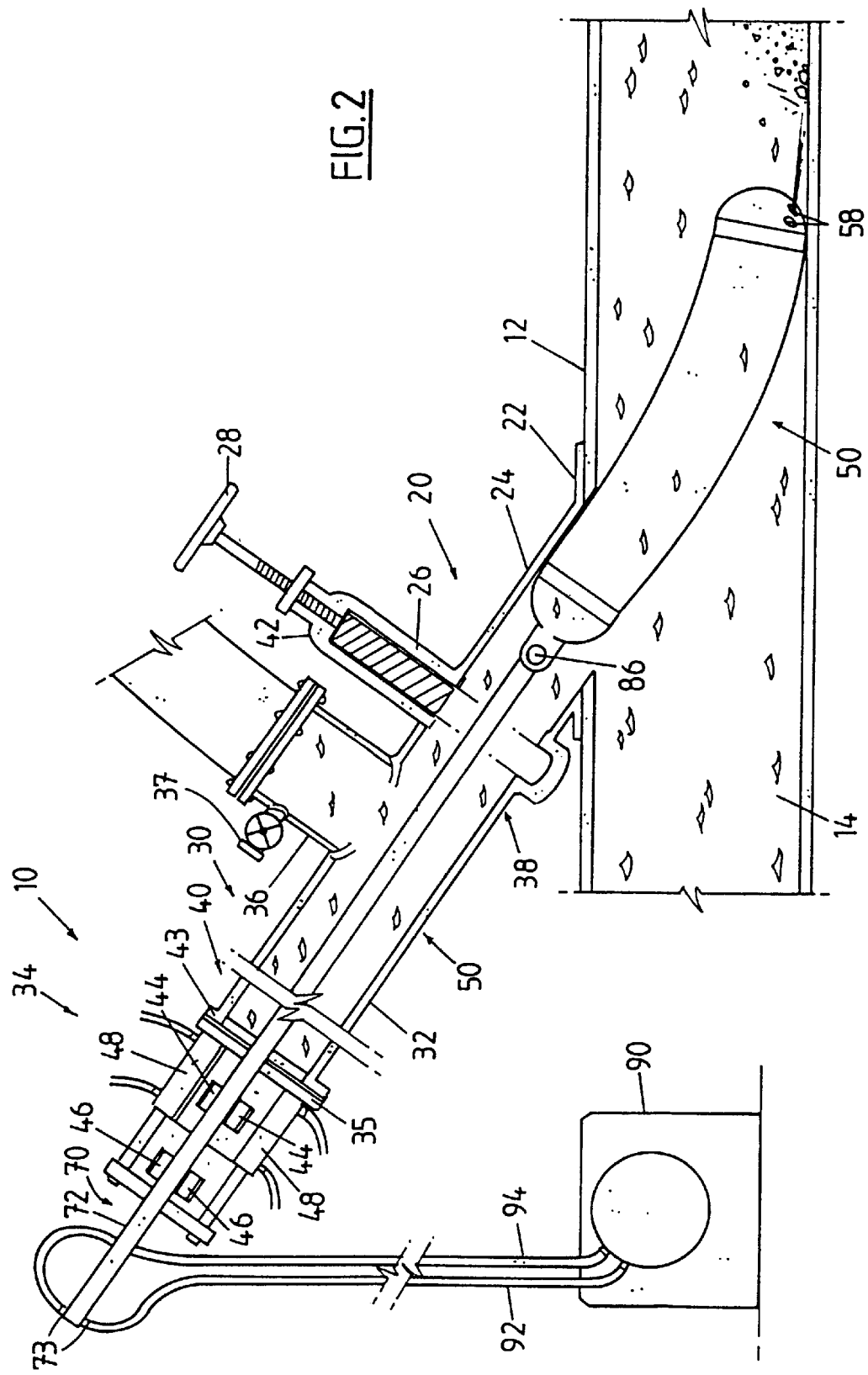
FIG. 2 shows a linestopping plug partially inserted into the pipe in accordance with the present invention.
Figure 3:
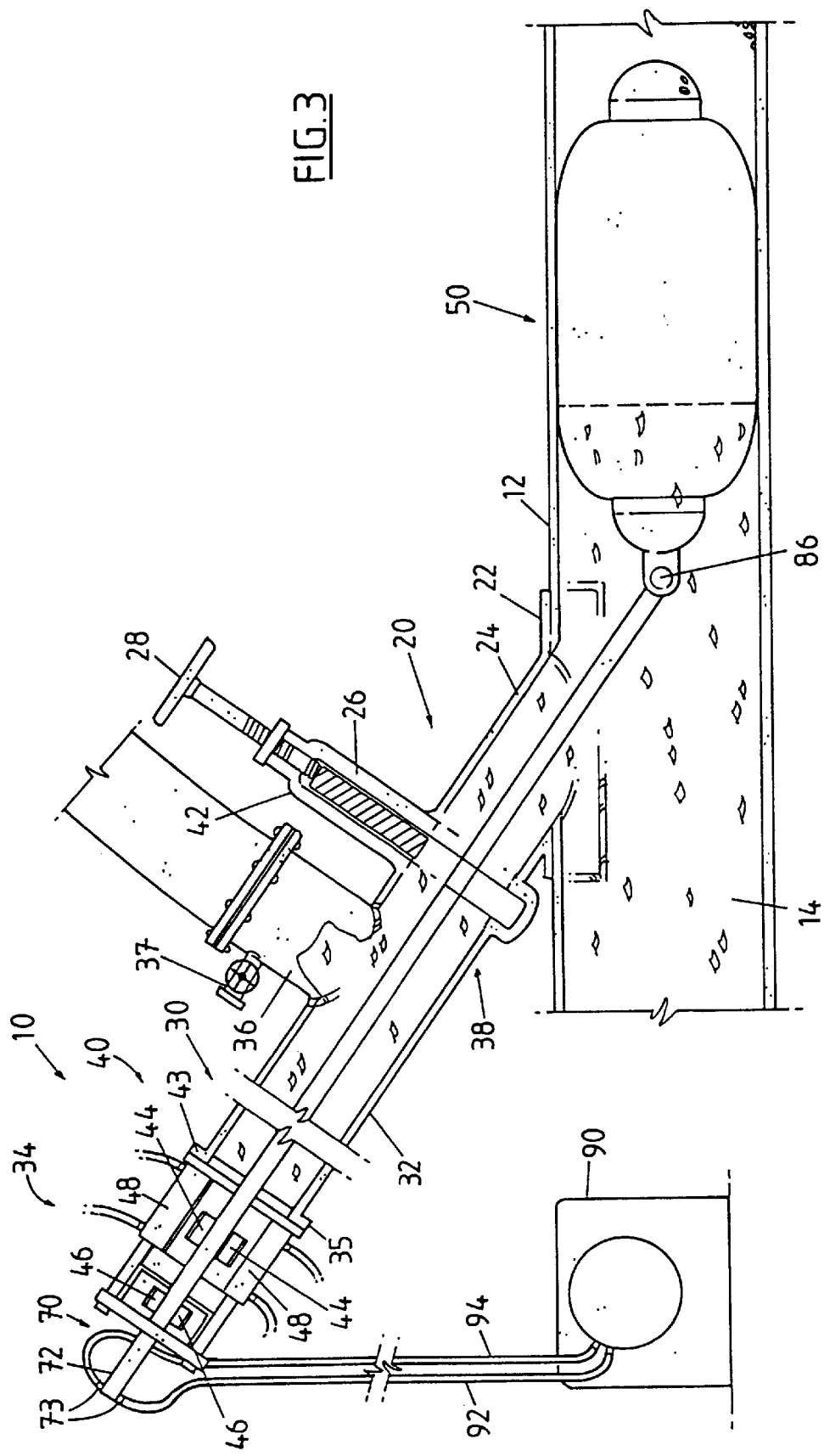
FIG. 3 shows the linestopping plug inserted into the pipe and inflated in accordance with the present invention.

In FIGS. 1,2 and 3 there is shown a linestopping system 10. The linestopping system 10 includes a branch pipe support 20, an insertion apparatus 30, a linestopping plug 50, an insertion push rod 70 and a pumping means 90.

The linestopping system 10 may be attached to a pipe 12 for the stopping of the flow of a fluid in a pipe 12 such as a water supply pipe.

The branch pipe support 20 includes a curved apertured flange panel 22 substantially the same or slightly larger in diameter than the outside diameter of the pipe 12 to which it is to be attached. The branch pipe support 20 also includes a pipe section 24 which is attached to the flange panel 22 at a first end and has a reinforced connection flange 26 at a second end. The connection flange 26 includes a valve 28 which allows the branch support pipe 20 to be sealed off so as to prevent fluid loss from the pipe 12. The connection flange 26 may include apertures for attachment means such as nuts and bolts to enable the insertion apparatus 30 to be securely and releasably attached. The pipe section 24 is joined to the flange panel 22 such that the centre line of the pipe section 24 forms an angle of between 30 and 50 degrees, preferably between 35 and 45 degrees, for example, about 40 degrees to the flange panel 24.

Once the flange panel 22 is mounted to the pipe 12, an aperture is cut in the pipe 12 by any convenient cutter means member in the pipe section 24.

The insertion apparatus 30 includes an insertion pipe 32, an insertion mechanism 34 and a number of bypass pipe connectors 36.

Figure 5:
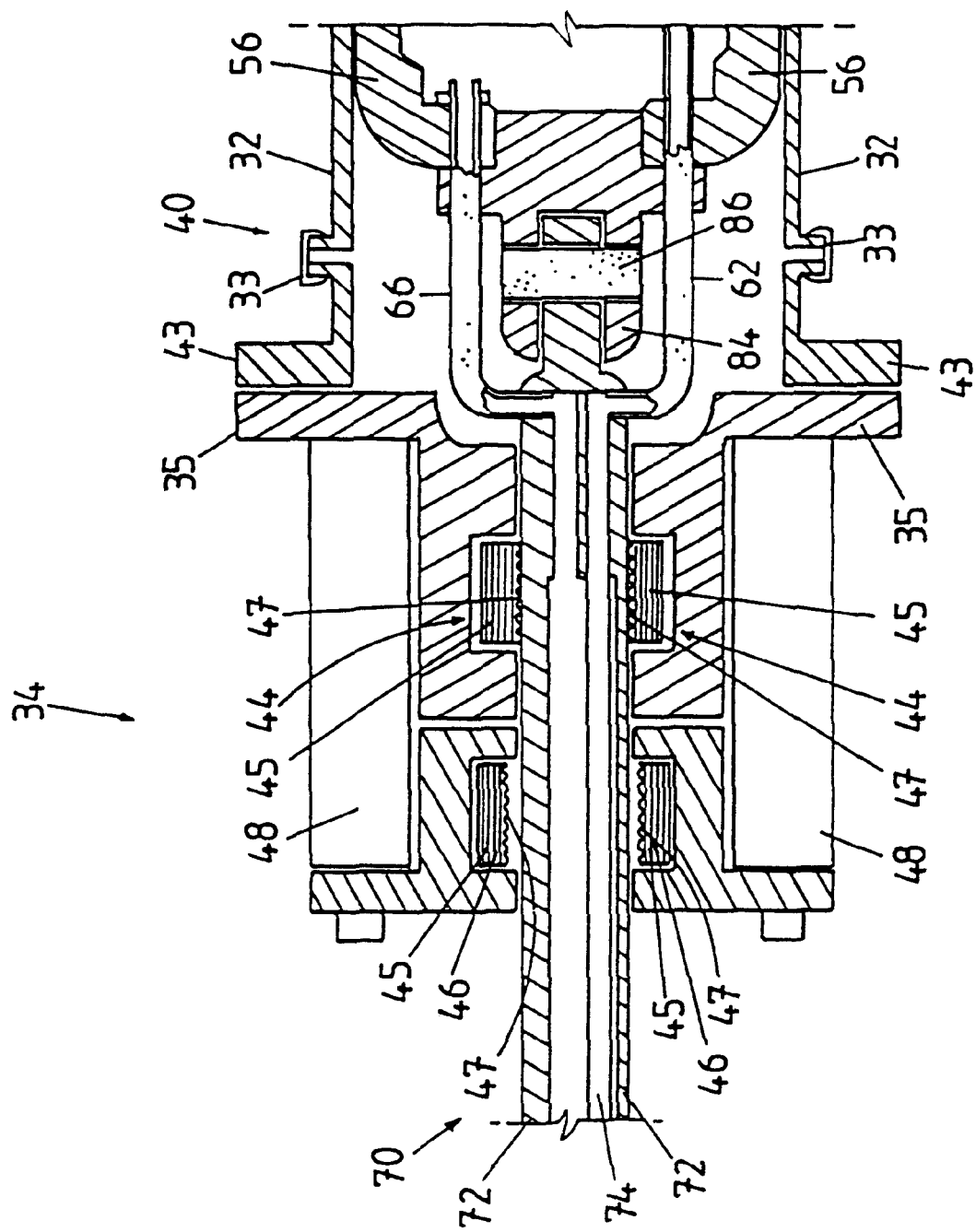
FIG. 5 shows a cross section of the insertion device in accordance with the present invention.
Figure 6:
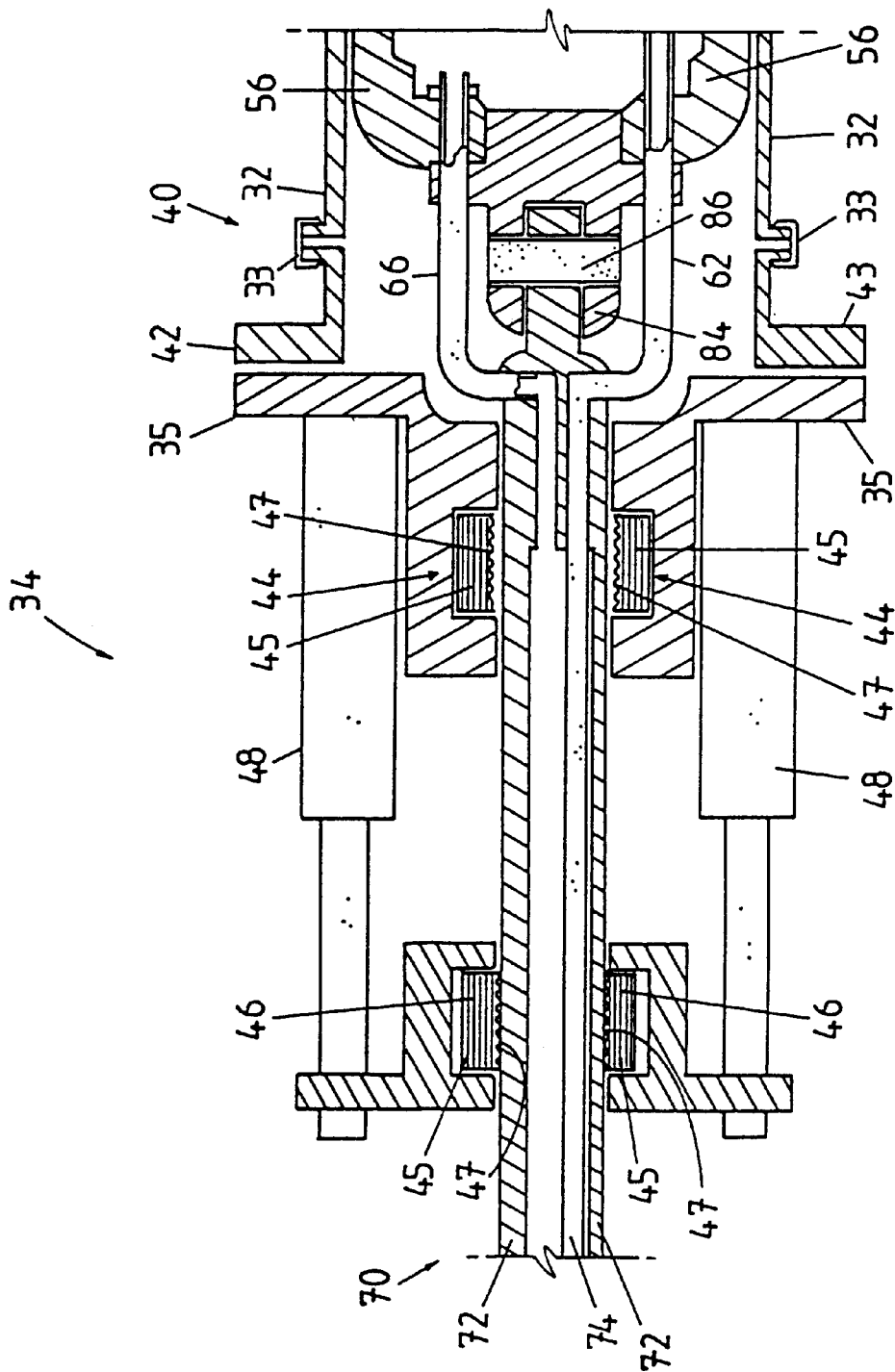
FIG. 6 shows a cross section of the insertion device in a second position in accordance with the present invention.

The insertion pipe 32 has a lower end 38 and an upper end 40, the lower end 38 includes a connection flange 42 and at least one bypass pipe connectors 36. The upper end 40 of the insertion pipe 32 includes a connection flange 43. The upper end of the insertion pipe 32 also includes a number of valves 33 as seen in FIGS. 5 and 6. The valves 33 may be used to release air from the insertion pipe 32 when the valve 28 is opened. The connection flange 42 attaches to the connection flange 26 in use, thus joining the insertion apparatus 30 to the branch pipe support 20.

The insertion mechanism 34 is attached to the upper end 40 of the insertion pipe 32 at the connection flange 43. The insertion mechanism 34 holds and inserts the push rod 70 during the insertion of the plug 50 into the pipe 12. The insertion mechanism 34 is described in more detail below.

The push rod 70 is attached to the plug 50. The push rod 70 includes a hollow tube 72 which the clamping means 44 and 46 grip and push into the pipe 12 using the jacking means 48. The plug 50 may also be withdrawn using the push rod 70.

The tube 72 is hollow, and may be between 3 and 7 metres long such as 4 to 6 metres long, and includes a set of attachments 73 at the upper end for pressurised fluid to be fed into the tube 72. A hose 74 also runs down the middle of the tube 72 to feed pressurised fluid to the plug 50. Further, the tube 72 incorporates attachments at its lower end so that pressurised fluid may be fed into the upper end attachment 73 through to the lower end of the tube 72 and then fed into the plug 50 as seen in FIGS. 5 and 6.

The pressurised fluid is supplied by a fluid supplying means 90. The fluid supplying means 90 supplies fluid at two pressure levels. The lower pressure level fluid is fed into the tube 72 by hose 92 through attachment 73 for use in inflating the plug 50. The higher pressure fluid is fed along hose 94 and into a hose 74 in the tube 72 through another attachment 73 as seen in FIG. 1 and 2.

Figure 4:
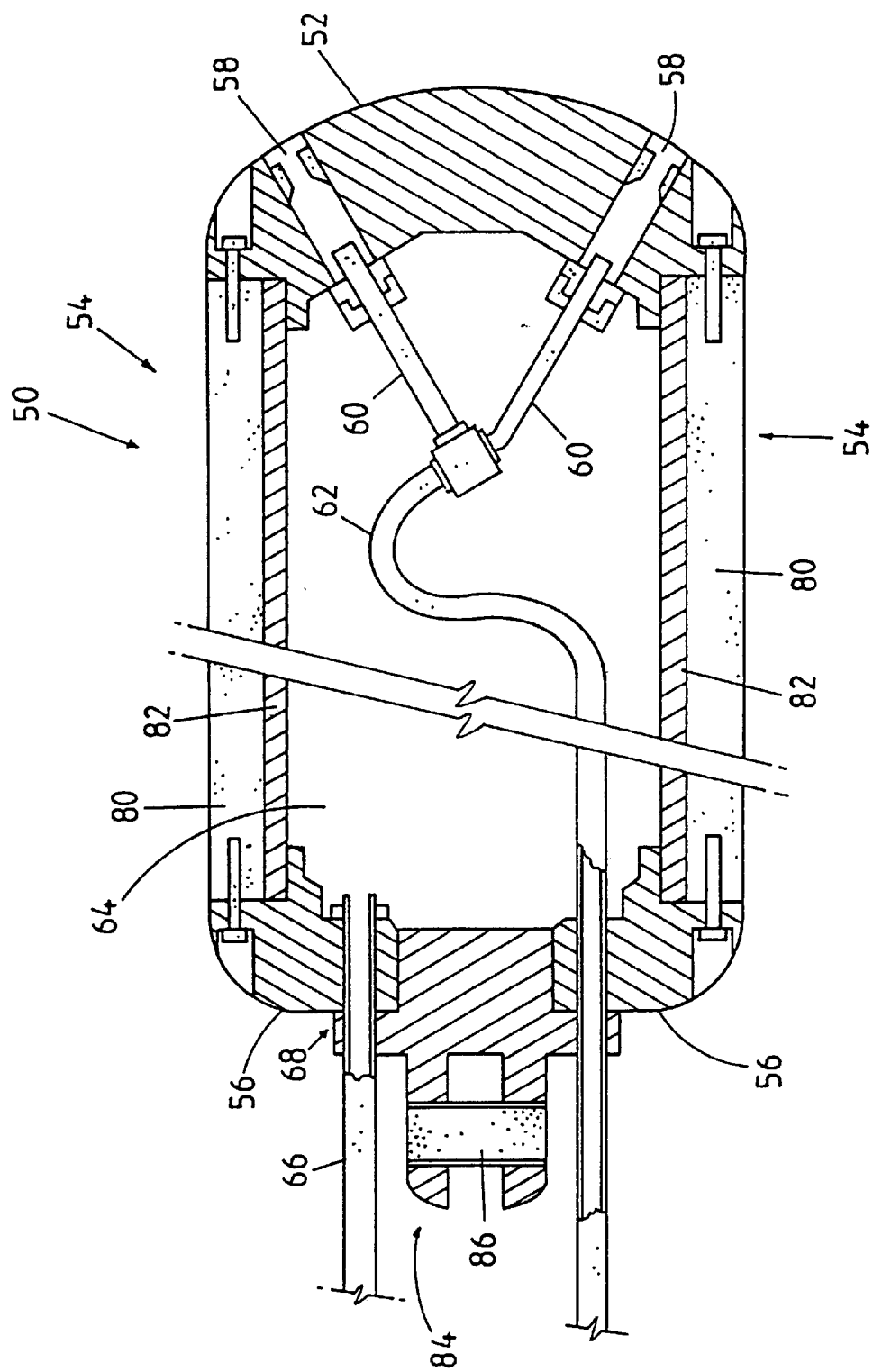
FIG. 4 shows a cross section of the linestopping plug accordance with the present invention.

In FIG. 4 there is shown a plug SO. The plug 50 includes a nose cone 52 a balloon 54 and a base plug 56. The balloon 54 is sealingly attached to the nose cone 52 and the base plug 56 such that the balloon 54 may expand to a diameter of up to 3 times the diameter of the nose cone 52 and the base plug 56, as can be seen in FIG. 3.

The nose cone 52 includes a plurality of apertures 58. The apertures 58 are located on the side of the nose cone 52 which is lowermost when the nose cone is inserted into the pipe 12. Each aperture 58 is connected to an inlet pipe 60. The inlet pipes 60 join together and connect to a single jet hose 62. The jet hose 62 runs through the length of the plug 50 to the interior of base plug 56. The jet hose 62 is sealingly connected to the base plug 56 and the jet hose 62 exits the base plug 56 and connects to the base of the tube 72 of the push rod 70. The jet hose 62 enters the base of the tube 72 and connects to the hose 74 which continues up the inside of the tube 72 until it reaches the end where it exits the tube 72 and connects to a fluid supplying means 90 as seen in FIG. 1 and 5.

The plug 50 is inflated by a fluid, typically water, being pumped into an interior cavity 64 of the plug 50 by the fluid supplying means 90. The pressure of the fluid causes the plug 50 to inflate and increase in diameter. The fluid is fed into the cavity 64 of the plug 50 from an inflation pipe 66. The inflation pipe 66 feeds the pressurised fluid from the interior of the tube 72 into a connection 68 in the base plug 56.

The balloon 54 is constructed from an outer cover of flexible soft material 80, such as rubber, and an interior of resilient strands 82 woven around the interior of the material 80. The material 80 is between 20 and 60 mm, for example, 40 mm thick.

The plug 50 is designed to fit snugly inside the insertion pipe 32. The construction of the balloon 54 allows the balloon 54 to expand, such as up to three times the original diameter, while having the properties of a soft deformable outer skin and a firm inner core which can withstand internal pressures sufficient to inflate the balloon 54 in the interior of a pipe 12 in which pressurised fluid is flowing.

The base plug 56 incorporates an attachment means 84 which allows the push rod 70 to be connected to the plug 50. The attachment means forms a joint 86 which allows the plug 50 to be hingedly attached to the push rod 70 allowing the plug 50 to align itself and be substantially in longitudinal alignment with the pipe 12 as can be seen in FIG. 1,2 and 3.

FIGS. 5 and 6 shows a cross section of the insertion device 34 attached to the insertion pipe 32, the push rod 72 and the base plug 56 of the plug 50. The insertion device 34 includes an insertion support 35. The first clamping means 44, second clamping means 46 and jacking means 48 are attached to the insertion support 35.

The first clamping means 44 and the second clamping means 46 each include a set of hydraulic clamps 45. Each hydraulic clamp 45 includes a gripping surface 47.

The first clamping means 44 are fixedly attached to a recess in the insertion support 35. The second clamping means 46 are fixedly attached to the jacking means 48. The jacking means 48 moves the second clamping means 46 between a first position shown in FIG. 5 and a second position shown in FIG. 6.

The insertion device 34 may include a sealing mechanism to stop any leakage of fluid from around the tube 72.

To move the push rod 70 into the pipe 12, the following sequence of operation is performed.

The first clamping means 44 engages and holds the tube 72 of push rod 70 in position while the jacking means 48 moves the second clamping means 46 to the second position as seen in FIG. 6. The second clamping means 46 then engage the tube 72 holding it immovably with respect to the second clamping means 46. The first clamping means 44 is then disengaged from the tube 72. The jacking means 48 then moves the second clamping means 46 and therefore the tube 72 towards the first clamping means 44, to the first position as shown in FIG. 5.

This operation is repeated to move the push rod 70 and thus the plug 50 into the pipe 12. By reversing the aforementioned procedure the push rod 70 and plug 50 may be withdrawn from the pipe 12 back into the insertion pipe 32. This operation is known as 'Hand over Hand' and allows the insertion apparatus 34 to insert the plug 50 into a live or pressurised pipe 12 in which there may be fluid flowing under a considerable pressure. The clamping means 44 and 46 allows the tube 72 and plug 50 to be firmly and securely located with respect to the aperture in the pipe 12. The hand over hand method provides a secure grip and allows the plug 50 to be removed from the pipe 12 even as flow in the pipe 12 applies pressure in the upstream side 14 of the pipe 12.

Figure 7:
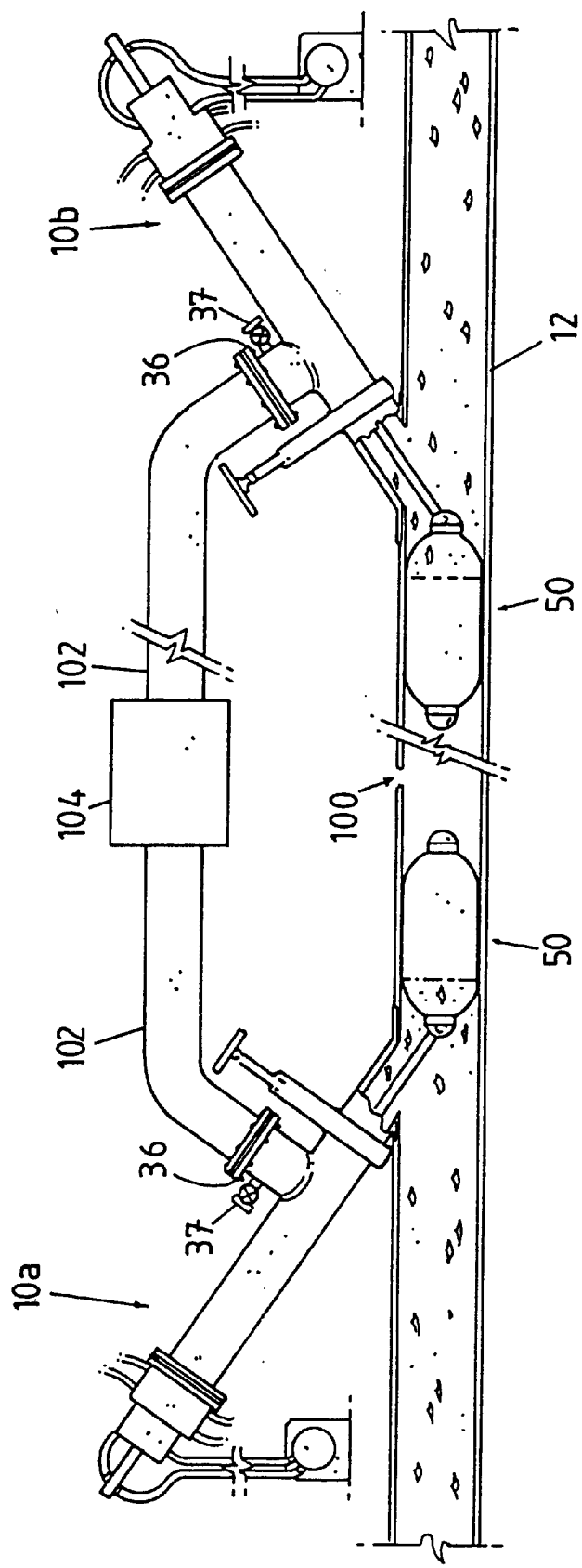
FIG. 7 shows two linestopping system as shown in FIG. 3 inserted into the pipe and inflated in accordance with the present invention.

In FIG. 7 there is shown two linestopping systems 10a and 10b used to block off a section of a pipe 12 that has been damaged. The plugs 50, when inserted allow a damaged section 100 of the pipe 12 to be isolated. The flow of fluid in the pipe is able to be maintained by diverting the fluid out of the linestopping system 10a on the upstream side of the damaged section 100 through bypass pipe connector 36 into bypass pipe 102. To maintain an adequate flow of fluid through the bypass pipe 102 a pump 104 can be situated along the pipe 102.

The preferred embodiment and an example of use is described as follows.

In use, to stop the flow of fluid in a pipe 12 the following procedure is employed. The branch support pipe 20 is welded or otherwise permanently attached to a section of a pipe 12 in an upstream position 14 of a section of the pipe 12 to which flow is to be stopped. The branch support pipe 20 is situated in a position at the top of the pipe 12, that is if the pipe is looked at in cross section the centre line of the pipe 24 would be in a substantially twelve o'clock position.

The branch support pipe 20 has a pipe section 24 which is at an angle of between 30 and 50 degrees, for example 40 degrees to the angle of the centre line of the pipe 12. The angle of 40 degrees provides the plug 50 with an angle of entry that allows the nose cone 52 to slide across the bottom the pipe 12 at a reduced friction force than if the angle was higher. Further the entrance angle of 40 degrees from the centreline of the pipe 12 reduces the overall height of the linestopping system 10 when in use.

A cutting device in a substantially watertight housing may be sealingly attached to the branch support pipe 20 and the valve 28 is opened. The cutting device enters the branch support pipe 20 and cuts a section of the pipe 12 out. The valve 28 is then sealed and the housing and cutting device are removed. The valve 28 may be in the form of a sluice gate.

The insertion apparatus 30 is then releasably and sealingly attached to the branch pipe 20. The insertion apparatus 30 has the plug 50 attached to the push rod 70 situated snugly inside the pipe a s can be se en in FIG. 1. The valve 28 is then opened and the insertion apparatus 30 is used to move the push rod 70 toward the pipe 12, which thereby causes the plug 50 to be inserted into the pipe 12 as can be seen in FIG. 2. When the plug 50 is inserted into the pipe 12 it is then inflated as seen in FIG. 3. The inflation of the plug 50 causes the flow in the pipe 12 to stop.

To keep the fluid flowing in a pipe 12, linestopping systems 10a and 10b may be employed at an upstream and downstream position of, for example, a break in the pipe 12, as can be seen from FIG. 7. Once the linestopping systems 10a and 10b are in position the flow in the bypass pipe connectors 36 may be started by opening the valves 37. The fluid in the pipe 12 may then flow through bypass pipe 102 without interruption around the section of pipe 12 to be isolated. The flow of the fluid in the bypass pipe 102 may be increased by using a pump 104 as seen in FIG. 7.

In many older pipes there can be considerable debris on the floor of the pipe 12. This debris can reduce the effectiveness of the linestopping operation and make it difficult for the plug 50 to be inserted into the pipe 12. To alleviate this problem the following method may be employed.

The high pressure fluid from the fluid supplying means 90 may be fed from the hose 94 into the hose 74 and then into jet hose 62 and through to the apertures 58 where it is expelled to push debris out of the way. The insertion angle of the plug 50 causes the nose plug 52 to push some of the debris out of the way, and the high pressure fluid from the jet hose 62 assists in the removal of any debris left over. The plug 50 may be inserted more than once to push and squirt clear a large enough section of pipe for an effective linestopping operation.

The plug 50 of the linestopping system 10 includes a thick outer covering of rubber. The plug 50 may be approximately 400 mm in outer diameter when uninflated for use with a pipe 12 of approximately 1000 mm inner bore. The plug 50 for this type of pipe 12 would be approximately 3.5 m long when uninflated. The length of plug 50 and the deformable rubber outer cover allow the plug 50, when uninflated in the pipe 12, to seal around debris and irregularities of up to 100 mm in size.

When the section of pipe to be replaced or repaired has been attended to, the linestopping plug or plugs 50 may be deflated and withdrawn from the pipe. The deflated plugs 50 are withdrawn into the pipe by the insertion mechanism 34. The valve 28 is then closed and the insertion mechanism 34 can be detached from the branch pipe support 20. The branch pipe support 20 is left in position on the pipe 12 permanently.

The linestopping system 10 may be used with a large variety of pipe diameters and with very high internal pressures, for example up to 1100 kpa.

The length of the plug 50 allows for a larger surface area than other known linestopping devices. The larger surface area of the plug 50 results in a lower pressure being required to effectively stop the flow in the pipe 12. This is very important in frail and old pipes as too high on internal pressure may rupture or further damage the pipe.

Modifications and variations such as would be apparent to the skilled addressee are deemed to be within the scope of the present invention.

I claim:

1. A line stopping system for water supply pipes characterized by first and second line stopping means, each line stopping means including an elongated inflatable plug, an inflation means and an insertion means, first and second branch pipe supports each having an apertured flange with a pipe section mounted thereon at an acute angle, each pipe section containing a valve wherein, in use, the pipe supports are disposed on a pipe in spaced apart locations with the pipe sections facing in opposite directions such that upon apertures being cut in the pipe at the pipe supports inflatable plugs of respective line stopping means may be inserted by the insertion means through the apertures in the pipe and subsequently inflated by the inflation means so as to seal off a section of the pipe, wherein each inflatable plug includes a nose portion and a base portion and an annular inflatable balloon portion sealingly attached to the nose portion and the base portion, the nose portion, the base portion and the balloon portion defining a hollow portion of the inflatable plug, the base portion being connected to the insertion means, the nose portion leading into the pipe upon insertion and the base portion trailing into the pipe upon insertion, and the balloon portion being sufficiently flexible when uninflated so as to bend when the inflatable plug contacts an interior wall of a water supply pipe upon introduction by the insertion means so as to facilitate insertion and also being arranged to be inflated to a larger diameter than the nose portion or the base portion, the balloon portion of each inflatable plug including a soft deformable outer skin and a firm inner core which can withstand internal pressures, the outer skin being arranged, when the balloon is inflated, to engage around its entire periphery with the interior wall of the pipe with the outer skin and the inner core being disposed at the periphery of the hollow portion.

2. A line stopping system according to claim 1, characterized in that the hollow portion extends longitudinally from the nose portion to the base portion and laterally across the entire width of the inflatable plug within the balloon portion.

3. A line stopping system according to claim 1, characterized in that the firm inner core is formed of resilient strands woven around the interior of the soft deformable outer skin.

4. A line stopping system according to claim 3, characterized in that the outer skin is from 20 mm to 60 mm thick.

5. A line stopping system according to claim 1, characterized in that a respective relatively low pressure conduit extends from the inflation means to each inflatable plug through the respective base portion thereof, and each inflatable plug is provided with a high pressure nozzle in the nose portion thereof, for expelling a high pressure jet of fluid into the pipe for clearing away debris at the bottom of the pipe, the nozzle being connected by a relatively high pressure fluid conduit through the base portion to a supply of fluid.

6. A line stopping system according to claim 5, characterized in that each high pressure fluid conduit is contained within a low pressure fluid conduit over a major portion of its length.

7. A line stopping system according to claim 1, characterized in that the acute angle of the pipe sections is from 30° to 50° to the center line of the pipe.

8. A line stopping system according to claim 7, characterized in that the acute angle of the pipe sections is from 35° to 45° to the center line of the pipe.

9. A line stopping system according to claim 1, characterized in that there is provided a bypass pipe which is arranged to extend between the first and second line stopping means to allow fluid flow to be maintained when the section of the pipe is sealed off.

10. A line stopping system according to claim 9, characterized in that the bypass pipe contains a pump for enhancing fluid flow along the bypass pipe.

11. A line stopping system according to claim 1, characterized in that each insertion means includes a plurality of sets of hydraulic clamps, a first set of clamps being fixed relative to the insertion means and a second set of clamps being movable relative to the insertion means, such that the first and second sets are relatively movable so as to cause insertion of the respective inflatable plug into the pipe.

* * * * *